July 7, 1959  H. A. SHERWOOD  2,894,192
MOTOR GOVERNOR
Filed Feb. 24, 1956
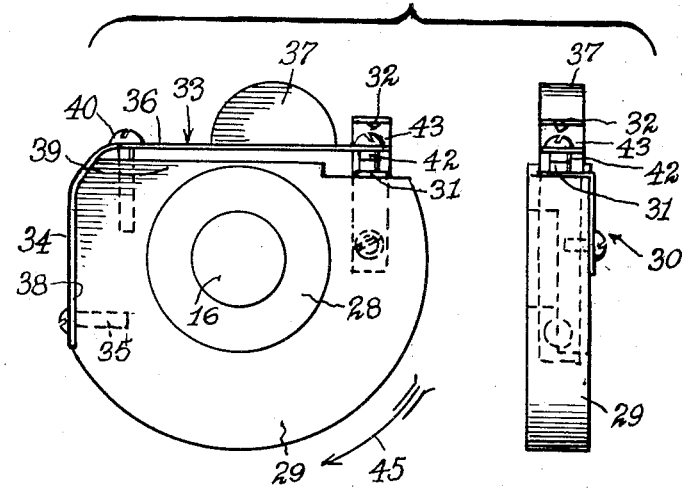
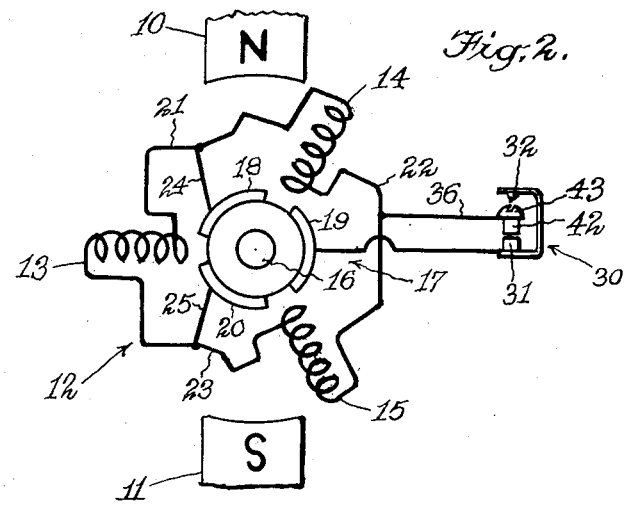
INVENTOR.
Henry A. Sherwood
BY
Munn, Liddy, Nathanson & March
ATTORNEYS United States Patent Office 2,894,192
Patented July 7, 1959

2,894,192
MOTOR GOVERNOR

Henry A. Sherwood, Woodbridge, Conn., assignor to Minitone Inc., New York, N.Y., a corporation of New York Application February 24, 1956, Serial No. 567,559

5 Claims. (Cl. 318—325)

This invention relates to fractional horsepower electric motors of relatively small power, and more particularly to governors or speed control means for such motors.

In the past it has been common practice to provide, in conjunction with a small electric motor, a centrifugal governor device which causes an interruption or breaking of a circuit of the motor in response to an increase in speed, thereby to effect a substantially constant speed for any setting of the governor. Such devices in some instances interrupt the entire motor circuit, and in other cases break a part of the field circuit by virtue of centrifugal control of make-and-break contacts.

These prior electric motor governors had as their main objective the maintaining of constant speeds within the range of adjustment of the governor. Thus, when the governor was set for any adjustment within its range, the motor would hold a given, corresponding speed irrespective of variations in its energizations and/or loading.

An object of the present invention is to provide a novel and improved governor for a small electric motor, which will operate to effect a steady, given motor speed for one set of conditions, and to effect a different and higher speed for another set of conditions, all without requiring adjustment or regulation.

In the specific embodiment of the invention illustrated and described herein, the sets of conditions by which the differential action of the governor is effected comprises changes in the voltage of the source of supply, i.e., the application to the motor of voltages comprising two different ranges.

Accordingly, another object of the invention is to provide a novel and improved governor means for a small electric motor, which means is automatically responsive to the application of different voltages to the motor, for the purpose of either maintaining the motor speed constant within certain limits, or permitting the motor to have a much greater speed than said constant one.

One important application of the motor and governor means of this invention is in connection with phonographs or record players. These devices currently require turntable speeds of 16⅔ r.p.m., 33 r.p.m., 45 r.p.m. and 78 r.p.m. By the present invention, the first three-mentioned speeds are effected by the motor with the governor thereof operative to maintain a constant motor speed, in conjunction with a variable transmission mechanism. For the turntable speed of 78 r.p.m., the motor governor has an action which provides a much higher speed of the motor.

In the present embodiment of the invention the two conditions of the governor are automatically effected by the application of either a voltage within a predetermined low range, or a voltage within a somewhat higher range.

It is accordingly a further object of the invention to provide an improved governor means for a small electric motor, by which, through suitable transmission equipment, different phonograph turntable speeds may be had within a low range, and yet a much higher turntable speed may be effected by utilizing as one factor a change of voltage which is applied to the motor.

A feature of the invention resides in the provision of a very simple, contact-controlling governor for an electric motor, which governor is characterized by a plurality of sets of contacts one of which operates at relatively low motor speeds and the other of which is operative at higher motor speeds.

Another feature of the invention resides in the provision of a novel and improved governor, for an electric motor, having cooperable contacts which are continuously mechanically active at low motor speeds and applied voltage, and having other cooperable contacts which are continuously mechanically inactive at high motor speeds and voltage.

A still further object of the invention is to provide a novel and improved contact-controlling governor means for a small electric motor, by which a motor circuit is continuously interrupted and completed for relatively low motor speeds, and wherein such circuit is maintained closed for relatively high motor speeds.

Yet another object of the invention is to provide an improved and simplified governor for a small electric motor, which is extremely sensitive to speed changes, and which thereby maintains the motor speed constant within relatively narrow limits.

Other features and advantages will hereinafter appear.

In the drawings accompanying this specification, similar characters of reference indicate corresponding parts wherever possible in the several views, in which:

Figure 1 is an elevational view of a motor governor made in accordance with the invention, mounted on a motor shaft for rotation therewith.

Fig. 2 is a schematic circuit diagram and diagrammatic representation of the motor circuit and governor connected therewith.

Referring first to Fig. 2 there is shown diagrammatically an electric motor having a two-pole field comprising a north pole 10 and a south pole 11, and having a three-pole armature or rotor 12 having armature coils 13, 14 and 15. The armature 12 has a shaft 16 carrying a commutator 17 provided with segments 18, 19 and 20. The armature coils 13, 14 and 15 are connected in series by wires 21, 22 and 23, and the wires 21 and 23 are joined to the commutator segments 18 and 20 respectively by wires 24 and 25.

It will be understood that the field poles 10 and 11 of the motor may be polarized in any desired manner, either by a permanent magnet source of flux, or an electromagnetic source of flux such as the usual field coil or coils.

In accordance with this invention there is provided a novel and improved governor for use in conjunction with the motor diagrammatically illustrated in Fig. 2, such governor being so constituted and arranged that it will maintain a low and substantially constant motor speed under one set of conditions, and enable a much higher motor speed to be effective in response to another set of conditions. In the example illustrated and described herein the two sets of conditions may comprise different applied voltages, as for example a first applied voltage of from three to five volts and a second applied voltage of six volts and over.

The improved governor of this invention is characterized by circuit-controlling contacts and a centrifugal member for actuating the contacts, which members is responsive to the motor speed. Referring now to Fig. 1, the motor shaft 16 may be provided with a hub 28 carrying a disk 29 on which there is fixedly mounted a contact assembly 30 comprising a heavy duty contact 31 and an oppositely-disposed, spaced light duty contact 32. The disk 29 also carries a resilient leaf spring 33 in the form generally of a right angle, having an anchoring leg secured to the disk 29 by a screw 35, and having a movable arm or leg 36 carrying a weight 37. The disk 29 has a pair of flats 38 and 39, as shown, to accommodate the leaf spring 33, and the movable arm 36 thereof is adjustable as to its position by means of an adjusting screw 40 passing through the arm and threaded into the disk 29.

At its rightmost extremity the arm 36 carries a pair of contacts 42 and 43 disposed back-to-back and adapted to cooperate respectively with the stationary contacts 31 and 32. Normally the resilient arm 33 is biased to maintain the contacts 42 and 31 in engagement, and to maintain separated the contacts 32 and 43. However, in response to sufficient rotational speed of the shaft 16 and disk 29, centrifugal force acting on the weight 37 will cause the latter and the arm 36 to be urged outward, thereby to separate the contacts 31, 42. If the speed of the shaft 16 and disk 29 are sufficient, the centrifugal force on the arm 36 and weight 37 will cause continual engagement of the contacts 32 and 43.

Referring now to Fig. 2, it will be seen that the movable contact arm 36 is electrically connected to the wire 22, and that the stationary contacts 31, 32 are connected to the commutator segment 19. Thus the centrifugal contact assembly 30 controls the connections between the wire 22 and the commutator segment 19. For low speeds of the motor, the wire 22 will be connected to the segment 19 through the switch assembly 30, by virtue of the contacts 31 and 42 being in engagement with each other. When a certain motor speed is reached, the contact arm 36 will shift outward under the action of centrifugal force, separating the contacts 31 and 42 and thereby disconnecting the wire 22 from the commutator segment 19. Upon this occurring the armature coils 14 and 15 will have their energization impaired to the extent where the power of the motor will be reduced, thereby resulting in a slowing of the armature shaft. This in turn will lessen the centrifugal force and cause reengagement of the contacts 31, 42. This action will be continuously repeated, thereby effecting constant speed of the motor. The armature windings and other proportions are so arranged that the above action will take place to maintain constant motor speed when a voltage within the range of three to five volts is applied to the motor. However, it should be understood that the motor will operate at the above constant speed for other voltages within different ranges, depending on the amount of iron and copper used in the motor and various conditions affecting the power, torque, etc.

By this invention, upon the application of a higher voltage to the motor, as for example a voltage of six or more, sufficient torque will be developed in the armature to immediately establish a higher shaft speed, such that centrifugal force will now urge the contact arm 36 and weight 37 outward and maintain the contacts 43 and 32 in continuous engagement. This, in conjunction with the higher applied voltage, will effect a much greater speed of the motor.

It has been found that by arranging the motor to have a direction of rotation as indicated by the arrow 45, such that the free end of the movable contact arm 36 is the leading end, and the anchored portion of the arm 36 is the trailing end, a much more sensitive response of the governor will be obtained, thereby providing a closer regulation of the armature speed.

It will be readily appreciated that, in accordance with the above, there has been provided an extremely simple yet effective and reliable speed governing device for use in conjunction with a relatively small electric motor, such speed governing device being of the centrifugal, contact-controlling type yet responding to different conditions of applied voltage to effect the different conditions of speed. The motor and control of this invention has been found to be extremely advantageous in connection with the driving of phonograph turntables and the like, wherein turntable speeds of 16⅔ r.p.m., 33 r.p.m., 45 r.p.m., and 78 r.p.m. are desired. The various components involved in the governor are of simple construction, and the entire governor may be readily, easily and economically fabricated.

Variations and modifications may be made within the scope of the claims, and portions of the improvements may be used without others.

I claim:

1. An electric motor comprising a rotor having electromagnetic means including circuits therefor; sets of electrical contacts, some of which are fixedly carried by the rotor; and means including a control member movable in response to centrifugal force, said member being movably mounted on the rotor and carrying other contacts of said sets, for continuously making and breaking one of said circuits through said electromagnetic means when the rotor is turning at a rate within a relatively low speed range, and for maintaining closed said circuit when the rotor is turning at a higher rate of speed, said electromagnetic means comprising three armature coils, said rotor having a commutator and said one circuit comprising a connection between two of the armature coils and a commutator segment.

2. The invention as defined in claim 1 in which the armature coils are connected in series, and in which the said connection is made to a juncture between two adjacent armature coils.

3. An electric motor comprising a rotor having electromagnetic means including circuits therefor; sets of electrical contacts, some of which are fixedly carried by the rotor; and means including a control member movable in response to centrifugal force, said member being movably mounted on the rotor and carrying other contacts of said sets, for continuously making and breaking one of said circuits through said electromagnetic means when the rotor is turning at a rate within a relatively low speed range, and for maintaining closed said circuit when the rotor is turning at a higher rate of speed, said electromagnetic means comprising armature coils, said rotor having a commutator, and said one circuit comprising a connection between the armature coils and a commutator segment.

4. An electric motor comprising a rotor having electromagnetic means including circuits therefor; sets of electrical contacts, some of which are fixedly carried by the rotor; and means including a control member movable in response to centrifugal force, said member being movably mounted on the rotor and carrying other contacts of said sets, for continuously making and breaking one of said circuits through said electromagnetic means when the rotor is turning at a rate within a relatively low speed range, and for maintaining closed said circuit when the rotor is turning at a higher rate of speed, said sets of contacts comprising a pair of spaced contacts fixed to the rotor and comprising a pair of contacts cooperable with the fixed contacts and carried by the control member and interposed between the said fixed contacts.

5. An electric motor comprising a rotor having electromagnetic means including circuits therefor; sets of electrical contacts, some of which are fixedly carried by the rotor; and means including a control member movable in response to centrifugal force, said member being movably mounted on the rotor and carrying other contacts of said sets, for continuously making and breaking one of said circuits through said electromagnetic means when the rotor is turning at a rate within a relatively low speed range, and for maintaining closed said circuit when the rotor is turning at a higher rate of speed, said control member comprising an elongate leaf spring extending transversely of the axis of the rotor, the trailing edge of said leaf spring being attached to the rotor and the leading edge being movable in response to centrifugal force.

References Cited in the file of this patent

UNITED STATES PATENTS

| | | |
|---|---|---|
| 1,857,202 | Lee | May 10, 1932 |
| 1,982,000 | Griffith | Nov. 27, 1934 |
| 2,246,803 | Lee | June 24, 1941 |
| 2,568,774 | Sparklin | Sept. 25, 1951 |
| 2,643,871 | Warrick | June 30, 1953 |